(12) United States Patent
Jiang et al.

(10) Patent No.: US 11,633,768 B2
(45) Date of Patent: Apr. 25, 2023

(54) IN-SITU REAGENTS INJECTION SYSTEM AND METHOD

(71) Applicant: CHINESE RESEARCH ACADEMY OF ENVIRONMENTAL SCIENCES, Beijing (CN)

(72) Inventors: Yonghai Jiang, Beijing (CN); Beidou Xi, Beijing (CN); Yu Yang, Beijing (CN); Xinying Lian, Beijing (CN); Xiangjian Xu, Beijing (CN); Yongfeng Jia, Beijing (CN); Fu Xia, Beijing (CN); Xu Han, Beijing (CN)

(73) Assignee: Chinese Research Academy of Environmental Sciences, Beijing (CN)

( * ) Notice: Subject to any disclaimer, the term of this patent is extended or adjusted under 35 U.S.C. 154(b) by 322 days.

(21) Appl. No.: 16/840,142

(22) Filed: Apr. 3, 2020

(65) Prior Publication Data
US 2020/0316662 A1 Oct. 8, 2020

(30) Foreign Application Priority Data
Apr. 4, 2019 (CN) .......................... 201910274417.X

(51) Int. Cl.
*B09C 1/00* (2006.01)
*B09C 1/08* (2006.01)
(Continued)

(52) U.S. Cl.
CPC ................ *B09C 1/002* (2013.01); *B09C 1/08* (2013.01); *B65G 53/16* (2013.01); *B65G 53/40* (2013.01); *B65G 53/52* (2013.01); *B09C 2101/00* (2013.01)

(58) Field of Classification Search
CPC ....... B09C 1/002; B09C 1/08; B09C 2101/00; B09C 1/00; B65G 53/16; B65G 53/40; B65G 53/52
(Continued)

(56) References Cited

U.S. PATENT DOCUMENTS

| 4,157,730 | A | * | 6/1979 | Despois | .............. | F28D 20/0056 |
| | | | | | | 165/45 |
| 6,457,905 | B1 | * | 10/2002 | Nickell | ..................... | B09C 1/00 |
| | | | | | | 210/170.07 |

(Continued)

FOREIGN PATENT DOCUMENTS

| CN | 105251759 A | * | 1/2016 | ............... | B09C 1/00 |
| CN | 205207706 U | * | 5/2016 | ............. | F16K 1/226 |

(Continued)

OTHER PUBLICATIONS

Translation of KR_100766859_B1 (Year: 2007).*
Translation of JP_2000120058_A (Year: 2000).*

*Primary Examiner* — Nam X Nguyen
*Assistant Examiner* — Ekandra S. Miller-Cruz
(74) *Attorney, Agent, or Firm* — Procopio, Cory, Hargreaves & Savitch LLP

(57) ABSTRACT

An in-situ reagents injection system comprises a compressed air storage tank, a remediation reagents storage tank, an injection adjusting valve, an injection pipe, an upper sealing device and a lower sealing device. When the reagents injection is carried out, the compressed air is injected before the remediation reagents is injected, the porosity of the aquifer medium is increased by utilizing the air pressure expansion technology to form a relatively uniform dominant channel, and the remediation reagents is injected to realize uniform and efficient conveying of the reagents. The in-situ reagents injection system and method can make the homogeneous and efficient conveying of the remediation reagents, (Continued)

and ensure the full utilization of the remediation reagents, with low energy consumption of injection equipment, simple process, and flexible operation. The injection is performed in sections from top to bottom according to the steps to improve the in-situ reagents injection efficiency and remediation efficiency.

8 Claims, 2 Drawing Sheets

(51) Int. Cl.
 *B65G 53/52* (2006.01)
 *B65G 53/40* (2006.01)
 *B65G 53/16* (2006.01)

(58) Field of Classification Search
 USPC .................................................. 210/747.8
 See application file for complete search history.

(56) References Cited

U.S. PATENT DOCUMENTS

| | | | | |
|---|---|---|---|---|
| 8,955,294 B2 * | 2/2015 | Free | ............... | B29B 9/16 |
| | | | | 53/529 |
| 2009/0277848 A1 * | 11/2009 | Slade | ............... | C02F 1/001 |
| | | | | 210/275 |
| 2017/0157654 A1 * | 6/2017 | Klock | ............... | C02F 3/00 |

FOREIGN PATENT DOCUMENTS

| | | | | | |
|---|---|---|---|---|---|
| CN | 105344703 A | * | 6/2016 | ............... | B09C 1/00 |
| CN | 106424122 A | * | 12/2016 | ............... | B01D 53/02 |
| CN | 109467282 A | * | 3/2019 | ............... | C02F 9/00 |
| JP | 2000120058 A | * | 4/2000 | ............... | E02D 3/12 |
| KR | 100766859 B1 | * | 10/2007 | ............... | E02D 7/00 |
| WO | WO-2010020002 A1 | * | 2/2010 | ............... | B09C 1/10 |

\* cited by examiner

IN-SITU REAGENTS INJECTION SYSTEM AND METHOD

TECHNICAL FIELD

The invention relates to the field of soil and groundwater pollution remediation, in particular to an in-situ reagents injection system and method.

BACKGROUND

A chemical agent is adopted in the in-situ injection technology, i.e., a remediation reagents is injected into an underground pollution area of a pollution site under the synergistic action of power equipment, a pipeline system and an injection well system, causing a series of geochemical reactions between the chemical agent and pollutants, and generating the effects of degradation, reduction, solidification and biological decomposition of the pollutants, so that the underground concentration load of the pollutants is decreased, and human health and ecological environment risks caused by the pollutants conduction by evapotranspiration, volatilization and groundwater flow are reduced.

The core and key points of the technology to achieve the purpose of efficient remediation is the directional and accurate injection and homogeneous and efficient transport of a remediation reagents in soil and groundwater. The directional and accurate injection of remediation reagents can be carried out according to the detailed investigation of soil and groundwater pollution conditions in contaminated sites and the accurate delineation of pollutant transport rules, and the homogeneous and efficient transport of remediation reagents is often affected by the high heterogeneity of aquifer media. The remediation reagents cannot be uniformly dispersed in an area to be remedied and even vertical backflow or cross flow between formations occurs in a preferential channel formed by the remediation reagents under the injection pressure, so that the injection of the in-situ reagents is failed. In the prior art, a device capable of realizing fixed-point quantitative release of a remediation reagents in a soil layer at any depth can be used for avoiding the problem of uneven distribution of the remediation reagents caused by different permeability coefficients of each soil layer. However, it can be realized only by adopting a multi-layer alternating mode of a water stopping section and a sand filling section, which is complicated for operations and limited in application in a groundwater in-situ injection remediation technology.

SUMMARY OF THE INVENTION

Accordingly, it is a primary object of the present invention to provide an in-situ reagents injection system and method in order to at least partially solve at least one of the above-mentioned technical problems.

In order to achieve the above object, in one aspect of the present invention, the invention provides an in-situ reagents injection system comprising a compressed air conveying pipeline, a remediation reagents conveying pipeline, an injection adjusting valve, an injection pipe, a first sealing unit and a second sealing unit;

wherein the compressed air conveying pipeline and the remediation reagents conveying pipeline are connected with the injection pipe at the same intersection, the intersection is provided with the injection adjusting valve, and the injection adjusting valve is configured for switching off the remediation reagents conveying pipeline when the compressed air is injected or switching off the compressed air conveying pipeline when the remediation reagents is injected;

the second sealing unit is arranged outside the pipe wall at the other end of the injection pipe, the first sealing unit is arranged outside the pipe wall at the position 0.5-0.75 m, away from the port at the other end, from the second sealing unit, and the first sealing unit and the second sealing unit are configured for forming a seal with the wall of the injection well when operated with the in-situ reagents injection system; and a plurality of openings are formed in the wall of the injection pipe between the first sealing unit and the second sealing unit.

In another aspect of the invention, the invention also provides an in-situ reagents injection method comprising the steps of:

forming an injection well;

placing an injection pipe of the in-situ reagents injection system into an injection well, wherein the pipe body part between a first sealing unit and a second sealing unit of the injection pipe is arranged at the upper part of the polluted underground water in the injection well, namely, the first sealing unit is positioned 5-10 cm below the water level of the polluted underground water; and repeating the sequential stage injection of the compressed air and the remediation reagents from top to bottom until the injection pipe, the first sealing unit and the second sealing unit are integrally moved downwards to the bottom of the polluted underground water to complete the whole reagents injection process.

Based on the technical solutions, the in-situ reagents injection system and method have at least one of the following beneficial effects compared with the prior art:

(1) the homogeneous and efficient conveying of the remediation reagents can be realized; by adopting the mode of the compressed air slow-pressure injection and the remediation reagents injection at intervals, the problem of uneven reagents diffusion caused by the heterogeneity of the aquifer medium can be effectively avoided, and meanwhile, the compressed air injection can be utilized to form uniform dominant pore channels to realize the transfer diffusion of the reagents in a larger range;

(2) the remediation reagents can be fully utilized; due to the adoption of the sectional reagents injection mode from top to bottom, the full utilization of the reagents can be ensured, namely, if there is any surplus, the reagents injected at the upper layer can migrate to the lower layer under the action of gravity, so that the polluted underground water at the lower layer is remedied;

(3) the energy consumption of the injection equipment is low; due to the adoption of the design of the nitrile rubber film, once compressed air and remediation reagents enter the injection well through the injection pipe, the compressed air and the remediation reagents can only diffuse outwards to enter the aquifer and cannot flow reversely to flow back to the injection pipe again, so that the energy consumption of the injection equipment is effectively reduced; and (4) the process is simple, and the operation is flexible; due to the adoption of the Y-shaped pipeline connection design and the installation of the injection adjusting valve, the injection pipeline can be adjusted by fully utilizing the original injection pressure; in addition, the injection time of each stage can be controlled by monitoring the concentration of the target pollutant in the underground water during actual engineering application, so as to achieve the purpose of fully and properly injecting a reagents and improve the pollutant removal efficiency.

Figure 1:
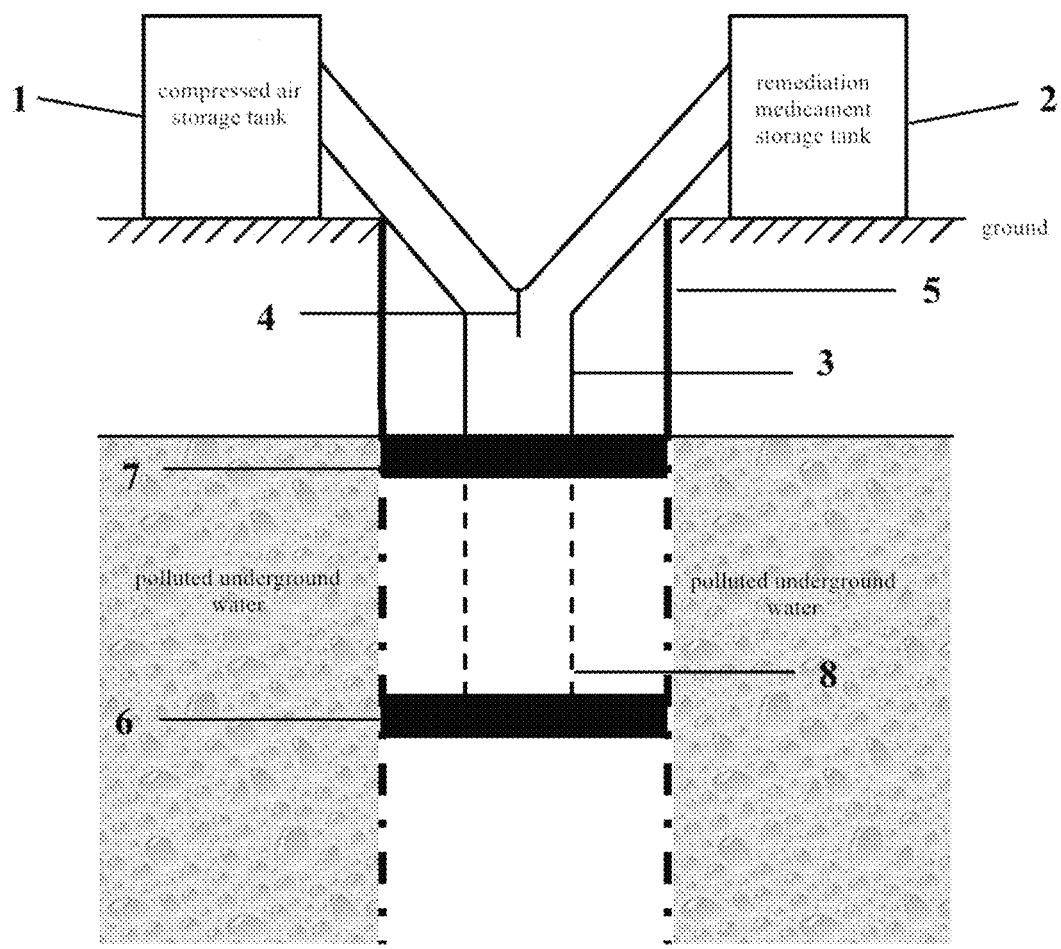
FIG. 1 is a structurally schematic view of an in-situ reagents injection system of the present invention.
Figure 2:
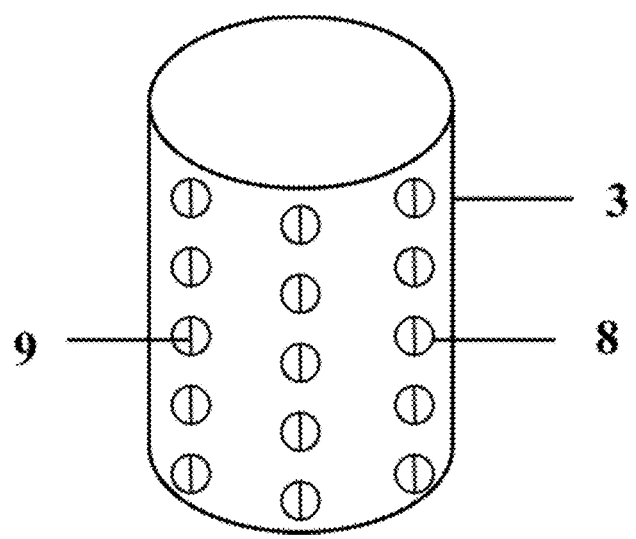
FIG. 2 is a schematic view showing arrangement of injection pipes and holes in the in-situ reagents injection system of the present invention.
Figure 3:
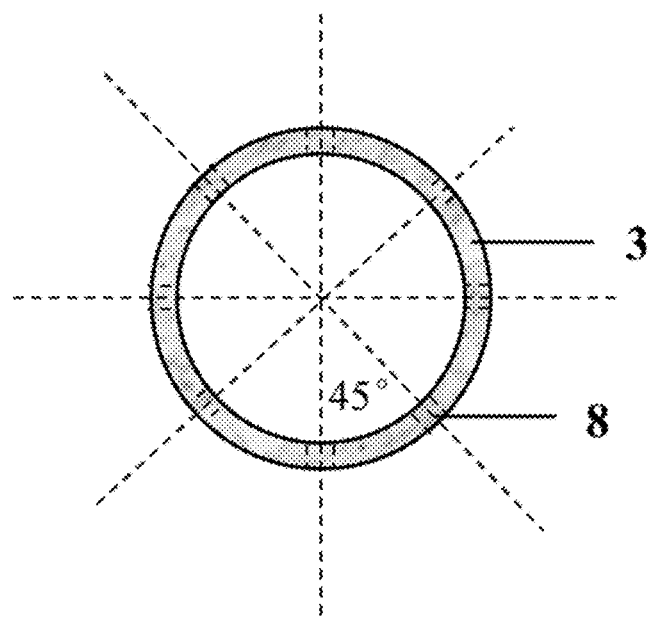
FIG. 3 is a cross-sectional view of the injection pipes and holes in the in-situ reagents injection system of the present invention.

In the above figures, the reference numerals are described as below:

1, a compressed air storage tank, 2, a remediation reagents storage tank, 3, an injection pipe, 4, an injection adjusting valve, 5, an injection well pipe, 6, a lower sealing device, 7, an upper sealing device, 8, a pipe hole, and 9, a nitrile rubber film.

DETAILED DESCRIPTION OF THE INVENTION

To further clarify the objects, technical solutions, and advantages of the present invention, a more particular description of the invention will be rendered by combining specific embodiments thereof, with reference to the appended drawings.

The invention discloses an in-situ reagents injection system and method, wherein the system comprises a compressed air conveying pipeline, a remediation reagents conveying pipeline, an injection adjusting valve, an injection pipe, an upper sealing device and a lower sealing device. When the reagents injection is carried out specifically, compressed air is firstly injected before the remediation reagents is injected, the porosity of the aquifer medium is increased by utilizing the air pressure expansion technology to form a relatively uniform dominant channel, and then the remediation reagents is injected to realize uniform and efficient conveying of the reagents. The in-situ reagents injection system and method provided by the invention can make the homogeneous and efficient conveying of the remediation reagents, and ensure the full utilization of the remediation reagents, with low energy consumption of injection equipment, simple process, and flexible operation. The injection is performed in sections from top to bottom according to the above steps to effectively improve the in-situ reagents injection efficiency and then the remediation efficiency.

Specifically, the in-situ reagents injection system comprises a compressed air conveying pipeline, a remediation reagents conveying pipeline, an injection adjusting valve, an injection pipe, a first sealing unit and a second sealing unit;

wherein the compressed air conveying pipeline and the remediation reagents conveying pipeline are connected with the injection pipe at the same intersection, the intersection is provided with the injection adjusting valve, and the injection adjusting valve is configured for switching off the remediation reagents conveying pipeline when the compressed air is injected or switching off the compressed air conveying pipeline when the remediation reagents is injected;

the second sealing unit is arranged outside the pipe wall at the other end of the injection pipe, the first sealing unit is arranged outside the pipe wall at the position 0.5-0.75 m, away from the port at the other end, from the second sealing unit, and the first sealing unit and the second sealing unit are configured for forming a seal with the wall of the injection well when operated with the in-situ reagents injection system; and a plurality of openings are formed in the wall of the injection pipe between the first sealing unit and the second sealing unit.

Preferably, the compressed air conveying pipeline has an air pressure adjusting function;

Preferably, a diameter of the injection adjusting valve is an inner diameter of a pipeline connected with the remediation reagents storage unit;

Preferably, the injection adjusting valve is a circular PVC sheet with a thickness of 1-3 mm.

Preferably, a radius of the injection pipe is ¼-½ of a radius of the injection well pipe.

Preferably, the injection pipe is a polyvinyl chloride, polyethylene or polypropylene pipe with a thickness of 2-4 mm.

Preferably, the injection pipe is provided with 4-12 rows of uniformly formed openings in the pipe wall of the pipe body between the first sealing unit and the second sealing unit; it is further preferred that the opening has a radius of 2-4 mm and that the openings of each row are equally spaced along the generatrix of the injection pipe with an opening spacing of 3-5 mm.

Preferably, a layer of nitrile rubber, natural rubber or acrylate rubber film is adhered inside the pipe body part of the injection pipe between the first sealing unit and the second sealing unit, and a plurality of slits are respectively formed in the film at positions corresponding to the plurality of openings.

Preferably, the first sealing unit and the second sealing unit both are rubber cylinders having a diameter equal to an inner diameter of the injection well pipe and with a thickness of 3-5 cm.

The invention also discloses an in-situ reagents injection method comprising the steps of:

forming an injection well;

placing an injection pipe of the in-situ reagents injection system into an injection well, wherein the pipe body part between a first sealing unit and a second sealing unit of the injection pipe is arranged at the upper part of the polluted underground water in the injection well, namely, the first sealing unit is positioned 5-10 cm below the water level of the polluted underground water; and repeating the sequential stage injection of the compressed air and the remediation reagents from top to bottom until the injection pipe, the first sealing unit and the second sealing unit are integrally moved downwards to the bottom of the polluted underground water to complete the whole reagents injection process.

Preferably, in the above steps of repeatedly performing sequential stage injection of the compressed air and the remediation reagents from top to bottom, the compressed air is firstly injected for 5-10 minutes, the air injection pressure is gradually increased with the extension of the injection time, and the remediation reagents is injected for 3-5 minutes after the injection of the compressed air is finished.

Preferably, in the above steps of repeatedly performing the sequential stage injection of the compressed air and the remediation reagents from top to bottom, the injection pipe, the first sealing unit and the second sealing unit are integrally moved downward by 0.5 to 0.75 m when the injection of the compressed air and the remediation reagents for each cycle is completed.

In a preferred embodiment, the in-situ reagents injection system of the present invention comprises a compressed air conveying pipeline, a remediation reagents conveying pipeline, an injection adjusting valve, an injection pipe, an upper sealing device and a lower sealing device;

wherein the compressed air conveying pipeline has an automatic air pressure adjusting function and is connected to a compressed air storage tank on the ground for pressure control of injected air, or temporarily forming compressed air with different pressures by a variable-power air compressor; the compressed air conveying pipeline and the remediation reagents conveying pipeline are connected with the injection pipe at the same intersection, for example in a "Y" connection, and an injection adjusting valve is provided at the "Y" intersection; the injection adjusting valve is preferably a circular PVC sheet having a diameter of 1-3 mm and a diameter equal to an inner diameter of the pipeline connected with the remediation reagents storage tank.

The injection pipe is a polyvinyl chloride (PVC), polyethylene (PE) or polypropylene (PP) pipe with a radius of ¼-½ of a radius of the injection well pipe and a thickness of 2-4 mm, the bottom end of the injection pipe is fixedly connected with the lower sealing device (the second sealing unit), and the upper sealing device (the first sealing unit) is arranged 0.5-0.75 m above the lower sealing device and fixedly connected with the injection pipe. The injection pipe is provided with holes uniformly formed in the pipe wall of the pipe body part between the upper sealing device and the lower sealing device. The holes in the pipe wall can be arranged in eight rows, the holes in the eight rows are staggered one by one, the corresponding central angle of the arc-shaped pipe wall between two adjacent rows of holes is 45°, the radius of the holes is 2-4 mm, the holes of each row are equally spaced along the generatrix of the injection pipe with a hole spacing of 3-5 mm. A layer of nitrile rubber, natural rubber or acrylate rubber film is adhered inside the pipe body part of the injection pipe between the upper sealing device and the lower sealing device, and the injection pipe is vertically cut open along the diameter at the hole.

The sealing device is a rubber cylinder having a diameter equal to an inner diameter of the injection well pipe and with a thickness of 3-5 cm.

When the reagents injection is carried out specifically, the pipe body part of the injection pipe between the upper sealing device and the lower sealing device is placed on the upper part of the polluted underground water, namely, the upper sealing device is positioned 5-10 cm below the water level of the polluted underground water, and the injection of compressed air and the remediation reagents is carried out from top to bottom. The compressed air is firstly injected for 5-10 minutes, the air injection pressure is gradually increased with the extension of the injection time, the remediation reagents is injected for 3-5 minutes after the injection of the compressed air is finished, then the injection pipe, the upper sealing device and the lower sealing device are integrally moved downwards by 0.5-0.75 m, and the injection steps are repeated until the injection pipe, the upper sealing device and the lower sealing device are integrally moved downwards to the bottom of the polluted underground water to complete the whole reagents injection process.

The aspects of the present invention are further described below with reference to specific embodiments and the accompanying drawings.

As shown in FIG. 1, the sectional slow-pressure type in-situ reagents injection system based on the air pressure expansion technology is composed of a compressed air storage tank 1, a remediation reagents storage tank 2, an injection adjusting valve 4, an injection pipe 3, an upper sealing device 7 and a lower sealing device 6.

The compressed air storage tank 1 is a compressed air storage tank with an automatic air pressure adjusting function, so that the pressure control of injected air is realized; in the actual operation process, compressed air with lower pressure is firstly injected to gradually open the pore channels of the aquifer medium, and then the air pressure is gradually increased, so that the generation of a non-uniform dominant channel caused by excessive instantaneous air pressure is avoided. The compressed air storage tank 1 and the remediation reagents storage tank 2 are connected with the injection pipe 3 in a Y shape through pipelines, and an injection adjusting valve 4 is arranged at the intersection of the Y shape. The injection adjusting valve 4 is a circular PVC sheet with a diameter equal to an inner diameter of a pipeline connected with the remediation reagents storage tank and a thickness of 1-3 mm, and is configured for sealing the pipeline connected with the remediation reagents storage tank 2 when the compressed air is injected or sealing the pipeline connected with the compressed air storage tank 1 when the remediation reagents is injected.

The injection pipe 3 is a polyvinyl chloride (PVC) pipe with a radius of ¼-½ of a radius of the injection well pipe 5 and a thickness of 2-4 mm, the upper end of the injection pipe is connected with a pipeline connecting the compressed air storage tank 1 and the remediation reagents storage tank 2, and the bottom end of the injection pipe is fixedly connected with a lower sealing device 6; and an upper sealing device 7 is arranged at 0.5-0.75 m above the lower sealing device 6 and fixedly connected with the injection pipe 3. The injection pipe 3 is provided with holes 8 uniformly formed in the side wall of the pipe body part between the upper sealing device 7 and the lower sealing device 6. The holes 8 in the side wall of the pipe body are arranged in eight rows, the holes in the eight rows are arranged in one-to-one correspondence, the corresponding central angle of the arc-shaped pipe wall between two adjacent rows of holes is 45°, the radius of the holes is 2-4 mm, the holes of each row are equally spaced along the generatrix of the injection pipe with a hole spacing of 3-5 mm. A layer of nitrile rubber film 9 is adhered inside the pipe body part of the injection pipe 3 between the upper sealing device 7 and the lower sealing device 6, and the injection pipe is vertically cut open along the diameter at the hole, so as to prevent the compressed air or the remediation reagents injected through the injection pipe 3 from flowing back to the injection pipe 3. The sealing devices 7, 6 are rubber cylinders having a diameter equal to an inner diameter of the injection well pipe 5 and with a thickness of 3-5 cm.

When the reagents injection is carried out specifically, the pipe body part of the injection pipe 3 between the upper sealing device 7 and the lower sealing device 6 is arranged at the upper part of the polluted underground water, namely, the upper sealing device 7 is positioned 5-10 cm below the water level of the polluted underground water, and the injection of compressed air and the remediation reagents is carried out from top to bottom. The compressed air is firstly injected for 5-10 minutes, the air injection pressure is gradually increased with the extension of the injection time, and the remediation reagents is injected for 3-5 minutes after the injection of the compressed air is finished, then the injection pipe 3, the upper sealing device 7 and the lower sealing device 6 are integrally moved downwards by 0.5-0.75 m, and the injection steps are repeated until the injection pipe 3, the upper sealing device 7 and the lower sealing device 6 are integrally moved downwards to the bottom of the polluted underground water to complete the whole reagents injection process.

The specific embodiments described above further explain the objects, technical solutions and beneficial effects of the present invention. It is to be understood that the foregoing is only illustrative of specific embodiments of the invention and not intended to limit the invention, and all modifications, equivalents, improvements, etc., made within the spirit and scope of the invention are intended to be included within the scope of the invention.

The invention claimed is:

1. An in-situ reagents injection system, comprising:
   a compressed air conveying pipeline providing compressed air to a first side of an injection well;
   a remediation reagents conveying pipeline providing remediation reagents to a second side of the injection well;
   an injection adjusting valve;
   an injection pipe;
   a first sealing unit; and
   a second sealing unit,
   wherein the compressed air conveying pipeline and the remediation reagents conveying pipeline are connected with the injection pipe at a same intersection in a Y connection located inside the injection well, the intersection is provided with the injection adjusting valve at the Y connection inside the injection well, and the injection adjusting valve is configured for switching off the remediation reagents conveying pipeline when the compressed air is injected or switching off the compressed air conveying pipeline when the remediation reagents are injected to the injection well,
   wherein the second sealing unit is arranged outside pipe walls at an end of the injection pipe, the first sealing unit is arranged outside the pipe walls at a position 0.5 m-0.75 m, away from a port at the end, from the second sealing unit, and the first sealing unit and the second sealing unit are configured for forming a seal with walls of the injection well when operated with the in-situ reagents injection system, and
   wherein a plurality of openings are formed in walls of the injection pipe between the first sealing unit and the second sealing unit.

2. The in-situ reagents injection system according to claim 1, wherein the compressed air conveying pipeline has an air pressure adjusting function.

3. The in-situ reagents injection system according to claim 1, wherein a diameter of the injection adjusting valve is an inner diameter of a pipeline connected with a remediation reagents storage unit, and
   wherein the injection adjusting valve is a circular PVC sheet with a thickness of 1 mm-3 mm.

4. The in-situ reagents injection system according to claim 1,
   wherein a radius of the injection pipe is ¼-½ of a radius of an injection well pipe.

5. The in-situ reagents injection system according to claim 1, wherein the injection pipe is a polyvinyl chloride, polyethylene or polypropylene pipe with a thickness of 2 mm-4 mm.

6. The in-situ reagents injection system according to claim 1, wherein the injection pipe is provided with 4-12 rows of uniformly formed openings in a pipe wall of a pipe body part between the first sealing unit and the second sealing unit, and
   wherein each of the openings has a radius of 2 mm-4 mm and that the openings of each row are equally spaced along a generatrix of the injection pipe with an opening spacing of 3 mm-5 mm.

7. The in-situ reagents injection system according to claim 1, wherein a layer of nitrile rubber, natural rubber, or acrylate rubber film is adhered inside a pipe body part of the injection pipe between the first sealing unit and the second sealing unit, and a plurality of slits are respectively formed in a film at positions corresponding to the plurality of openings.

8. The in-situ reagents injection system according to claim 1, wherein the first sealing unit and the second sealing unit both are rubber cylinders having a diameter equal to an inner diameter of an injection well pipe and with a thickness of 3 cm-5 cm.

* * * * *